(No Model.)
J. E. ANDERSON.
BICYCLE SUPPORT.
No. 461,806. Patented Oct. 27, 1891.
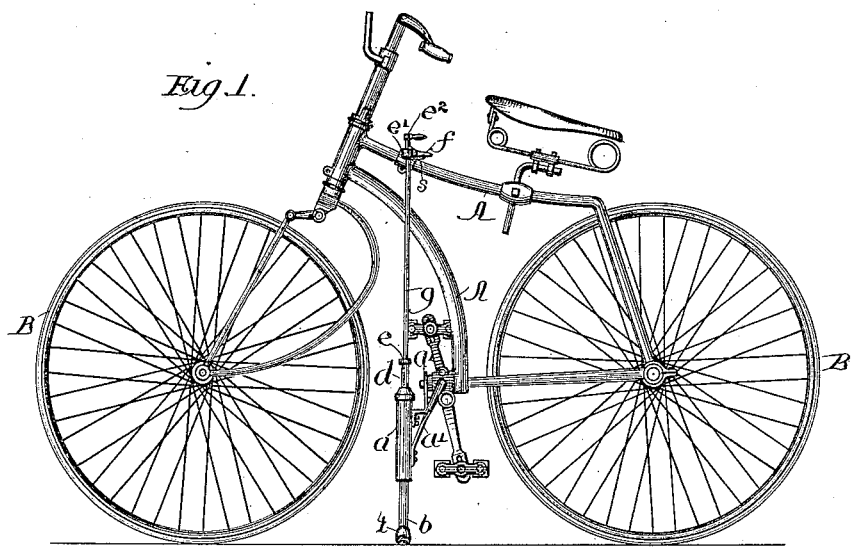
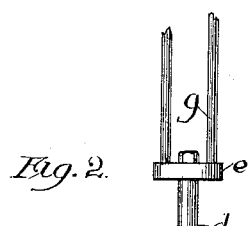
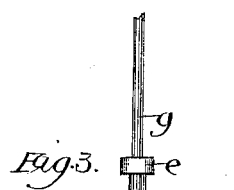
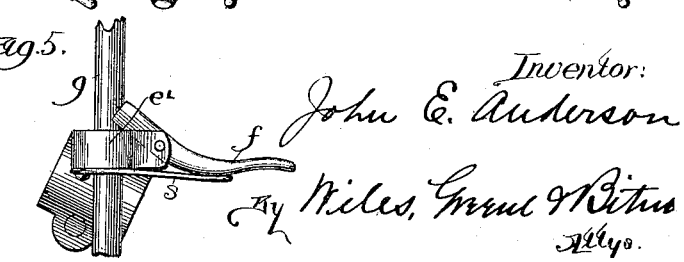
Witnesses.
Charles O. Shervey.
C. P. Smith.
Inventor:
John E. Anderson
By Wiles, Grundy & Bitner
Attys.

UNITED STATES PATENT OFFICE.

JOHN E. ANDERSON, OF BLOOMINGTON, ILLINOIS.

BICYCLE-SUPPORT.

SPECIFICATION forming part of Letters Patent No. 461,806, dated October 27, 1891.

Application filed June 29, 1891. Serial No. 397,771. (No model.)

*To all whom it may concern:*

Be it known that I, JOHN E. ANDERSON, a citizen of the United States of America, residing at Bloomington, in the county of McLean and State of Illinois, have invented certain new and useful Improvements in Bicycle-Supports, of which the following is a specification.

My invention relates to improvements in bicycle-supporting devices, the object of the invention being to provide a simple mechanism attached to the frame of the bicycle and operated by the bicycle-rider, certain parts of the mechanism being so constructed and arranged that when in one position they shall form a base sufficient to hold the bicycle upright, but when in another position shall be raised above the ground on which the bicycle rests and be out of the way of the operator.

The invention is fully described, explained, and claimed in this specification and shown in the accompanying drawings, in which—

Figure 1 is a side elevation of a complete bicycle provided with my supporting device in one of its forms. Fig. 2 is a view, partly in elevation and partly in transverse vertical section, illustrating the lower portion of the supporting device. Fig. 3 is a view, partly in elevation and partly in vertical section, illustrating the same parts shown in Fig. 2, the plane of section being at right angles to that in Fig. 2. Fig. 4 is a front elevation of a modified form of the lower part of the supporting device, and Fig. 5 is a side elevation of the catch or lock adapted to hold the movable parts of the device in their raised position.

In Figs. 1, 2, 3, and 5, A A are the parts of the main frame, and B B are the wheels of a bicycle of ordinary construction. A vertical case $a$ is secured to the lower portion of the main frame by means of braces $a'$ of suitable form and arrangement, the lower end of the case being slightly flaring, as indicated in Fig. 2. In the lower end of the case are two webs $a^2$, extending across it and forming in effect two slots, through which slide freely two curved legs $b\ b$, pivoted at their upper ends to a block $c$, which is adapted to slide freely up and down in the case. These curved legs are of such a form that when the block $c$ is drawn to the upper end of the case the legs lie closely side by side within the case and are wholly out of the way and hidden from view, and I have found it preferable to provide the lower ends of the legs with rubber tips $t$, adapted to fit closely within the slots at the bottom of the case when the legs are raised and prevent rattling of the parts. A piston $d$ is fastened at its lower end to the block $c$ and extends upward through a cap at the top of the case, the upper end of the piston being provided with a cross-head $e$, supporting two parallel rods $g\ g$, which extend upward through a guide $e'$, fastened to the upper portion of the frame of the machine at a point in front of the saddle. The upper ends of the rods $g\ g$ are connected by a block $e^2$, having a suitable handle, by means of which the rods, the piston $d$, and the legs $b\ b$ may be raised from the position illustrated in Figs. 1, 2, and 3 until the legs lie completely within the case. The weight of these movable parts is sufficient to throw the legs downward from their raised position when unsupported, and when the legs have been raised it is therefore only necessary to release them in order to bring them to the position illustrated in the drawings, in which they form a complete base sufficient to prevent the tipping of the machine in either direction. The form of the legs and their relation to the supporting parts is such that when the legs are dropped down to their operating position no amount of weight brought to bear on either side will force them upward into the case, and they therefore form a suitable support for the machine.

In order to support the legs within the case when raised it is necessary to provide some simple locking device, the one illustrated in Figs. 1 and 5 being the one which I have found preferable in practice, as it is positive in its operation, locks the movable parts automatically when raised, and offers but slight resistance to unlocking when it is desired to drop the movable parts into working position.

In the device thus illustrated, $e'$ is the guide fastened to the frame of the machine, and $g$ is one of the rods sliding in said guide, the rod being formed with a notch beveled both upward and downward, as shown. A locking-lever $f$ is pivoted in the rear margin of the guide-block, its front end being adapted to enter the notch in the rod g, while its rear end is extended backward a sufficient distance to permit easy operation of the lever. A spring s, fastened to the under surface of the guide-block, presses the rear end of the lever upward and the front end downward, and thereby holds the point of the locking-lever in contact with the rod. It is evident that the rod may be moved freely upward or downward without interference from the locking-lever until the notch in the rod reaches the point of the lever, when the point of the lever will enter the notch and lock the rod against downward movement. Downward pressure upon the rear end of the lever swings the front end upward in an arc of a circle having the pivot for a center, and as the notch in the rod is beveled upward it offers but slight resistance to the movement of the lever. As soon as the end of the lever is free from the notch the rod drops downward and the legs reach the position shown in Figs. 1, 2, and 3 and form a base of support for the machine in the manner already described.

It is evident that various forms of locking devices may be substituted for the one shown, and this one is illustrated and described merely as one simple and practical form.

Fig. 4 illustrates a modified form of supporting device, in which the legs b b and the block c, to which they are pivoted, lie outside of the support a instead of within it. The legs are connected with the support a by means of rods b', jointed to the lower end of the support a, and also to the legs at about their centers. It is evident that if the block c be raised from the position shown in Fig. 4 the legs will be drawn upward and folded inward against the support a and will be held above the ground and out of the way of the operator. The rods g and the means by which they are supported in their raised position are the same in this device as in the one illustrated in the preceding figures.

While the two forms illustrated in the drawings are not identical in construction, they resemble each other in certain general features and operate in very nearly the same way to produce the same result. In each of them there is a stationary support a, rigidly fastened to the frame of the machine, a single block c, sliding freely upon the support, two legs b b, pivoted at their upper ends to the sliding block, and means for sliding the block upon the stationary support. In both the constructions the connection of the legs with the lower end of the stationary support is such that as the legs are lowered their free ends are at the same time separated to form a broad base of support for the machine. The essential difference between the two forms is that in one of them the stationary support is hollow and receives and conceals the legs within it when they are raised, while in the other the legs lie outside of the support and are folded against it when raised.

While I prefer to use two rods, as shown, for raising and lowering the parts of the support, it is evident that where the construction of the frame of the machine would render it more convenient a single rod may be used.

My device, as shown in the drawings and thus far described in the specification, is susceptible of operation by means lying within reach of the rider when in the saddle, and this is the construction which I prefer and which will probably always be found most desirable. As it may, however, be found advisable in some cases to attach to a machine the adjustable supporting-legs so arranged as not to be operated from the top of the machine, I desire not to limit my invention to the combination of the base with the operating-rods, which extend upward to a point within reach of the rider.

Having now described and explained my invention, what I claim as new, and desire to secure by Letters Patent, is—

1. In a device of the class described, the combination, with a bicycle, of a stationary support fastened to the bicycle-frame, a block sliding freely on said support, two legs pivoted at their upper ends to said block, and means, substantially as shown and described, for raising and lowering said block, the connection of said legs with the lower end of said stationary support being adapted to force apart the ends of the legs as the block moves downward on said support and to draw them together as the block moves upward thereon, substantially as shown and described.

2. The combination, with the bicycle-frame, of the case a, fastened thereto, the curved legs b, lying within said case and adapted to drop downward therefrom and to form a base of support for the machine, the block c, connecting the upper ends of said legs, the piston d, extending upward from said block, the rods g, extending upward from said piston to a point in front of the saddle, and a locking-lever f, adapted to engage a notch in one of said rods and support it when in its raised position, substantially as described.

JOHN E. ANDERSON.

Witnesses:
JOHN M. HOLLAND,
J. M. SHACKFORD.